Feb. 19, 1935.   H. H. TIMIAN   1,991,967
ENGINE
Filed Aug. 6, 1931
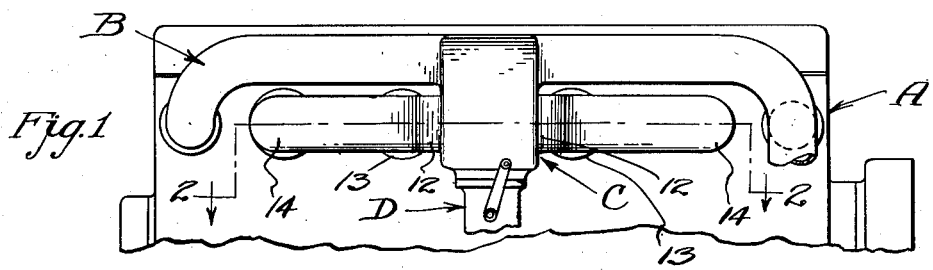
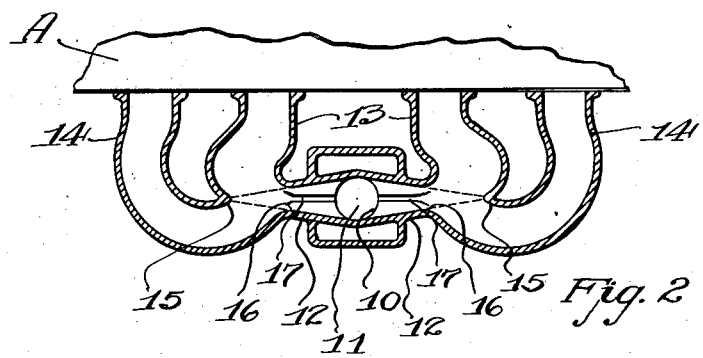
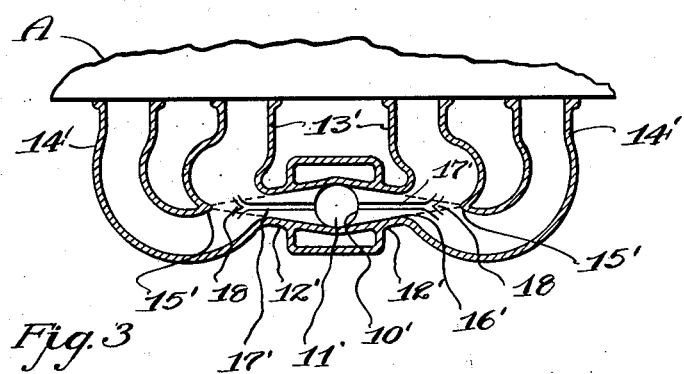
INVENTOR.
Harold H. Timian
BY
ATTORNEY.

Patented Feb. 19, 1935

1,991,967

UNITED STATES PATENT OFFICE 1,991,967

ENGINE

Harold H. Timian, Detroit, Mich., assignor to Continental Motors Corporation, Detroit, Mich., a corporation of Virginia Application August 6, 1931, Serial No. 555,474

7 Claims. (Cl. 123—52)

My invention relates to engines and more particularly to an intake manifold structure therefor for distributing a fuel mixture to the engine cylinders.

The problem of fuel mixture distribution for multi-cylinder engines has been very satisfactorily solved by providing a plurality of manifold branches, the manifold being so constructed adjacent the junction of said branches as to split the fuel mixture stream and distribute predetermined quantities of the fuel mixture to said branches in accordance with the number of cylinders associated with the branches in order that each engine cylinder will receive substantially equal quantities of the fuel mixture.

One of the features of my present invention is to provide an improved intake manifold structure embodying means in addition to said fuel mixture flow splitting means and cooperating therewith to effect a better control for the fuel mixture distribution.

For a more detailed understanding of my invention, reference may be had to the accompanying drawing which illustrates one form which my invention may assume, and in which:

Fig. 1 is a side elevational view of an internal combustion engine and associated intake manifold structure constructed in accordance with my invention, Fig. 2 is a horizontal sectional view taken substantially on the line 2—2 of Fig. 1, and Fig. 3 is a horizontal sectional view illustrating a modified form of construction.

In the accompanying drawing, the reference character A designates a multi-cylinder internal combustion engine, B the exhaust manifold, C the intake manifold structure and D the fuel mixture forming device or carburetor.

The intake manifold structure C consists of a primary fuel mixture conducting portion or riser 10 arranged to connect the fuel mixture forming device or carburetor D with the fuel mixture distributing chamber 11. Runners 12 communicate with the chamber 11 and preferably extend in opposite directions therefrom. Manifold branches 13 and 14 are constructed for conducting the fuel mixture to the engine cylinders (not shown) and are arranged in open communication with each runner.

The manifold structure herein illustrated is provided with a fuel mixture flow splitting means 15 or what I term a "split" that preferably extends vertically from the floor to the roof of the manifold at the junction of said branches and runner. In the illustrated embodiment of my invention this split 15 is preferably located in a vertical plane containing the runner axis for dividing or splitting the fuel mixture stream for distributing substantially equal amounts of the fuel mixture to the branches 13 and 14.

In order to more definitely control the fuel mixture flow I provide means adjacent to the junction of the branches and runner which acts on said fuel mixture flow to impart directional movement thereto and cause the fuel mixture stream to converge and be directed on the split 15. In the present embodiment of my invention, this is accomplished by providing the runner with a Venturi portion 16, the dotted lines in Figs. 2 and 3 illustrating how the fuel mixture flow is caused to converge on the split 15.

In Fig. 2 the runner 12 is provided with a groove 17 extending longitudinally thereof from the fuel mixture distributing chamber 11 to a point adjacent to the Venturi portion 16, said groove preferably extending to a point slightly beyond the venturi. This groove 17 serves to induce a stratified fuel mixture flow at both high and low engine speeds.

This Venturi portion, with or without the groove cooperates with the split 15 in such a way as to control the fuel mixture distribution.

In the modified construction illustrated by Fig. 3 the intake manifold structure is provided with a riser 10', a fuel mixture distributing chamber 11', a runner 12', branches 13' and 14' and a split 15'. The runner is provided with a Venturi portion 16' similar in construction to that illustrated by Fig. 2. In this latter construction, however, a groove 17' extends longitudinally of the runner and is preferably forked as at 18 adjacent the Venturi portion, said branch grooves preferably extending beyond the Venturi portion and imparting a positive directional movement to the fuel mixture.

The herein described arrangement which effects a flow control for the fuel mixture stream facilitates the final fuel mixture distribution by directing the fuel mixture against the split where the same can be quite readily divided into predetermined quantities so as to feed substantially equal quantities to the engine cylinders.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. An intake manifold structure for an internal combustion engine having a carburetor and including a fuel mixture distributing chamber, manifold branches, and an intermediate runner connecting said chamber and manifold branches, said manifold provided with means adjacent the junction of said runner and branches for splitting the fuel mixture flow and distributing predetermined quantities of same to said branches, said runner provided with a Venturi restricted portion acting on said fuel mixture flow to direct same substantially against said fuel mixture flow splitting means for controlling fuel mixture distribution.

2. An intake manifold structure for an internal combustion engine having a carburetor and including a fuel mixture distributing chamber, manifold branches, and an intermediate runner connecting said chamber and manifold branches, said manifold provided with means adjacent the junction of said runner and branches for splitting the fuel mixture flow and distributing predetermined quantities of same to said branches, said runner provided with a fuel mixture flow directing Venturi restricted portion adjacent to said fuel mixture flow splitting means and acting on said fuel mixture flow to direct same substantially against said splitting means whereby to control fuel mixture distribution.

3. An intake manifold structure for an internal combustion engine having a carburetor and including a fuel mixture distributing chamber, manifold branches, and an intermediate runner connecting said chamber and manifold branches, said manifold provided with means adjacent the junction of said runner and branches for splitting the fuel mixture flow and distributing predetermined quantities of same to said branches, said runner provided with means adjacent to said fuel mixture splitting means for imparting directional movement to said fuel mixture tending to converge same and cause a substantial portion of the fuel mixture to impinge on said splitting means.

4. An intake manifold structure for an internal combustion engine having a carburetor and including a fuel mixture distributing chamber, manifold branches, and an intermediate runner connecting said chamber and manifold branches, said manifold provided with means adjacent the junction of said runner and branches for splitting the fuel mixture flow and distributing predetermined quantities of same to said branches, said runner provided with a fuel mixture flow directing venturi adjacent the junction of said runner and branches and having a restricted portion spaced from said chamber, said Venturi portion acting on said fuel mixture flow to direct same substantially against said fuel mixture splitting means for controlling fuel mixture distribution.

5. An intake manifold structure for an internal combustion engine having a carburetor and including a fuel mixture distributing chamber, manifold branches, and an intermediate runner connecting said chamber and manifold branches, said manifold provided with a vertical split located substantially in a vertical plane containing the runner axis, said runner provided with a fuel mixture flow directing Venturi portion adjacent to and cooperating with said split whereby to direct the fuel mixture flow substantially longitudinally of said intermediate runner and impinge a substantial portion of the fuel mixture on said split for controlling fuel mixture distribution.

6. An intake manifold structure for an internal combustion engine having a carburetor and including a fuel mixture distributing chamber, manifold branches, and an intermediate runner connecting said chamber and manifold branches, said manifold provided with means adjacent the junction of said runner and branches for splitting the fuel mixture flow and distributing predetermined quantities of same to said branches, said runner provided with a Venturi portion adjacent to and cooperating with said fuel mixture flow splitting means and with a groove in the floor thereof for controlling fuel mixture distribution.

7. An intake manifold structure for an internal combustion engine having a carburetor and including a fuel mixture distributing chamber, manifold branches, and an intermediate runner connecting said chamber and manifold branches, said manifold provided with means adjacent the junction of said runner and branches for splitting the fuel mixture flow and distributing predetermined quantities of same to said branches, said runner provided with a Venturi portion adjacent to and cooperating with said fuel mixture flow splitting means and with a groove in the floor thereof terminating adjacent to said Venturi portion, said groove and Venturi portion acting to control fuel mixture distribution.

HAROLD H. TIMIAN.